US007254674B2

(12) United States Patent
Yamamoto et al.

(10) Patent No.: US 7,254,674 B2
(45) Date of Patent: *Aug. 7, 2007

(54) DISTRIBUTION OF I/O REQUESTS ACROSS MULTIPLE DISK UNITS

(75) Inventors: Akira Yamamoto, Cupertino, CA (US); Takao Satoh, Odawara (JP); Shigeo Honma, Odawara (JP); Yoshihiro Asaka, Odawara (JP); Yoshiaki Kuwahara, Odawara (JP); Hiroyuki Kitajima, Yokohama (JP)

(73) Assignee: Hitachi, Ltd. (JP)

( * ) Notice: Subject to any disclaimer, the term of this patent is extended or adjusted under 35 U.S.C. 154(b) by 81 days.

This patent is subject to a terminal disclaimer.

(21) Appl. No.: 10/799,013

(22) Filed: Mar. 11, 2004

(65) Prior Publication Data

US 2004/0177220 A1    Sep. 9, 2004

Related U.S. Application Data

(63) Continuation of application No. 09/813,382, filed on Mar. 20, 2001, now Pat. No. 6,728,832, which is a continuation-in-part of application No. 09/619,000, filed on Jul. 18, 2000, now Pat. No. 6,631,443, which is a continuation of application No. 09/116,344, filed on Jul. 16, 1998, now Pat. No. 6,108,750, which is a continuation of application No. 08/868,075, filed on Jun. 3, 1997, now Pat. No. 5,835,938, which is a continuation of application No. 08/355,274, filed on Dec. 12, 1994, now Pat. No. 5,680,574, which is a continuation of application No. 07/648,998, filed on Jan. 31, 1991, now abandoned.

(30) Foreign Application Priority Data

Feb. 26, 1990 (JP) ................................. 2-42452

(51) Int. Cl.
*G06F 13/16* (2006.01)
(52) U.S. Cl. .............. 711/114; 711/112; 711/147; 711/148; 711/153; 710/43; 710/110; 710/111; 709/105

(58) Field of Classification Search ................ 709/101, 709/104, 105, 214; 710/42, 43, 110, 111, 710/115; 711/4, 5, 112, 114, 147, 148, 150, 711/151, 153
See application file for complete search history.

(56) References Cited

U.S. PATENT DOCUMENTS 3,889,237 A * 6/1975 Alferness et al. .......... 711/148

(Continued)

FOREIGN PATENT DOCUMENTS

GB          2 086 625           5/1982

(Continued)

OTHER PUBLICATIONS

Information Process Institute Bulletin "Nishigaki et al., Analysis on Disk Cache Effects in a Sequential Access Input Process", vol. 25, No. 2, pp. 313-320 (1984).

*Primary Examiner*—B. James Peikari
(74) *Attorney, Agent, or Firm*—Townsend and Townsend and Crew LLP

(57) ABSTRACT

A method of respectively reading and writing data to and from a plurality of physical disk units in response to I/O requests from a host computing system includes establishing a logical disk group having a number of logical disk elements, mapping each of the logical disk elements to corresponding physical disk units, receiving from the host computing system an I/O request for data to select a one of the number of logical disk elements, accessing the physical disk unit corresponding to the selected one logical disk to access for the data, and transferring the accessed data to the host computing system.

6 Claims, 6 Drawing Sheets

U.S. PATENT DOCUMENTS

| | | | | |
|---|---|---|---|---|
| 4,152,764 | A | * | 5/1979 | Connors et al. ............ 711/151 |
| 4,495,567 | A | * | 1/1985 | Treen ......................... 710/107 |
| 4,598,362 | A | * | 7/1986 | Kinjo et al. ................. 711/148 |
| 4,718,006 | A | * | 1/1988 | Nishida ...................... 711/148 |
| 4,791,564 | A | * | 12/1988 | Takai .......................... 711/112 |
| 4,802,164 | A | * | 1/1989 | Fukuoka et al. ............... 714/44 |
| 4,803,653 | A | * | 2/1989 | Suzuki et al. ................ 711/148 |
| 4,837,680 | A | * | 6/1989 | Crockett et al. ............ 710/104 |
| 4,881,169 | A | * | 11/1989 | Tanaka et al. ................. 714/55 |
| 4,882,671 | A | * | 11/1989 | Graham et al. ................ 711/4 |
| 4,888,691 | A | * | 12/1989 | George et al. ................. 714/15 |
| 5,043,883 | A | * | 8/1991 | Inouchi et al. ............. 711/169 |
| 5,142,627 | A | * | 8/1992 | Elliot et al. ..................... 710/5 |
| 5,155,835 | A | * | 10/1992 | Belsan ....................... 711/114 |
| 5,155,845 | A | * | 10/1992 | Beal et al. ....................... 714/6 |
| 5,202,973 | A | * | 4/1993 | Ramanujan et al. ........ 711/147 |
| 5,276,836 | A | * | 1/1994 | Fukumaru et al. .......... 711/138 |
| 5,388,242 | A | * | 2/1995 | Jewett ........................ 711/113 |
| 5,481,694 | A | * | 1/1996 | Chao et al. ................. 711/112 |
| 5,568,628 | A | * | 10/1996 | Satoh et al. ................ 711/113 |
| 5,584,012 | A | * | 12/1996 | Kojima et al. .............. 711/122 |
| 5,608,891 | A | * | 3/1997 | Mizuno et al. ............. 711/114 |
| 5,651,132 | A | * | 7/1997 | Honda et al. ............... 711/114 |
| 5,680,574 | A | * | 10/1997 | Yamamoto et al. ......... 712/207 |
| 5,742,933 | A | * | 4/1998 | Kojima et al. .............. 711/113 |
| 5,813,024 | A | * | 9/1998 | Saito .......................... 711/113 |
| 5,835,938 | A | * | 11/1998 | Yamamoto et al. ......... 711/112 |
| 5,964,886 | A | * | 10/1999 | Slaughter et al. ............... 714/4 |
| 6,145,067 | A | * | 11/2000 | Kuwata ....................... 711/165 |
| 6,457,096 | B1 | * | 9/2002 | Ageishi et al. ............. 711/112 |
| 6,567,889 | B1 | * | 5/2003 | DeKoning et al. .......... 711/114 |
| 2002/0019920 | A1 | * | 2/2002 | Reuter et al. ............... 711/203 |
| 2002/0120812 | A1 | * | 8/2002 | Ageishi et al. ............. 711/114 |
| 2002/0124139 | A1 | * | 9/2002 | Baek et al. .................. 711/114 |

FOREIGN PATENT DOCUMENTS

| | | | |
|---|---|---|---|
| GB | 2086625 | * | 5/1982 |
| JP | 59-135563 | | 8/1984 |
| JP | 59135563 | * | 8/1984 |
| JP | 60-114947 | | 6/1985 |
| JP | 60114947 | * | 6/1985 |
| JP | 61-28128 | | 6/1986 |
| JP | 6128128 | * | 6/1986 |
| JP | 63056873 | * | 3/1988 |
| JP | 02-037418 | | 2/1990 |
| JP | 0237418 | * | 2/1990 |
| JP | 06-348421 | | 12/1994 |
| JP | 06348421 | * | 12/1994 |
| JP | 0-016328 | | 1/1996 |
| JP | 08016328 | * | 1/1996 |
| JP | 2002-298556 | | 10/2000 |
| JP | 2001-230836 | | 2/2001 |

* cited by examiner

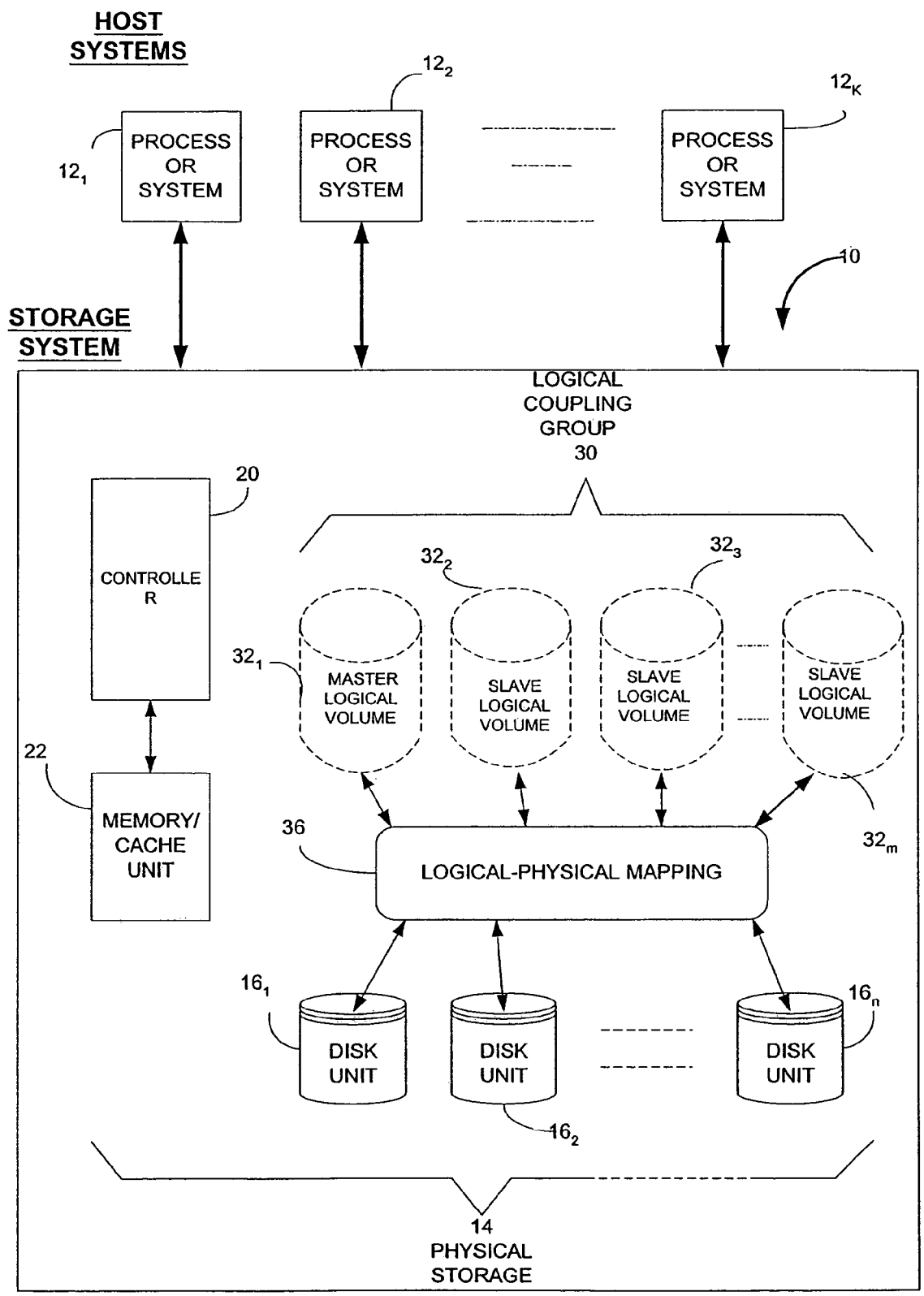
FIG_1

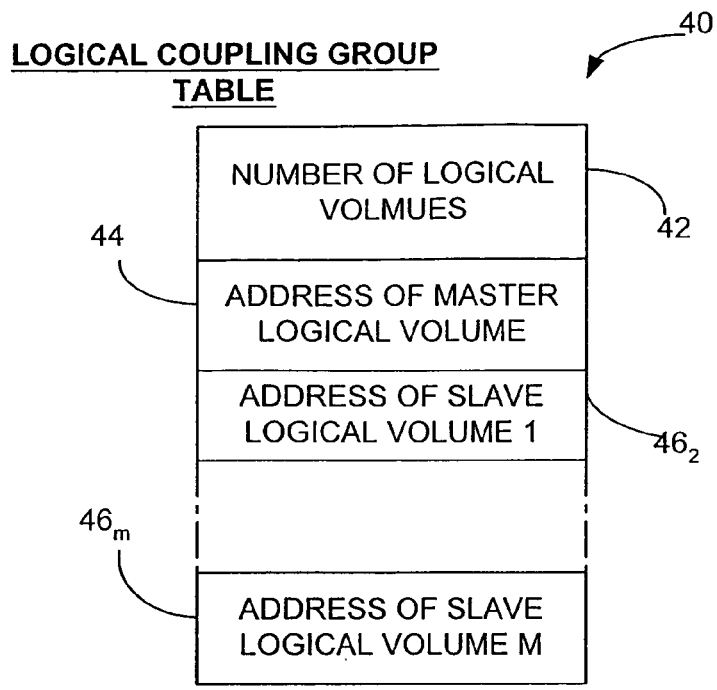
Fig_2
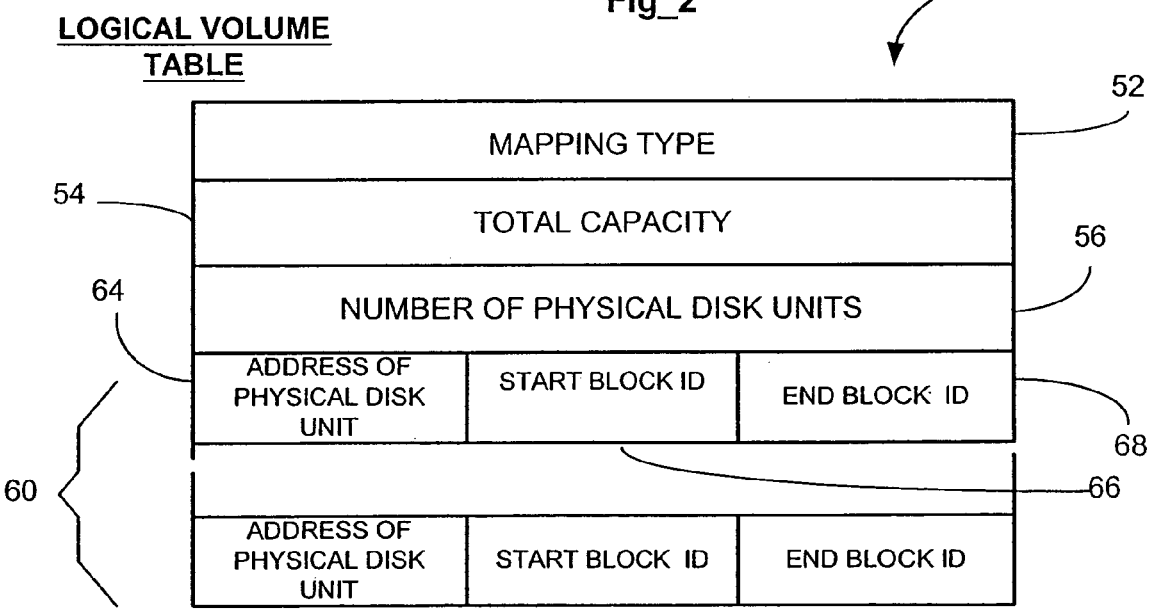
Fig_3
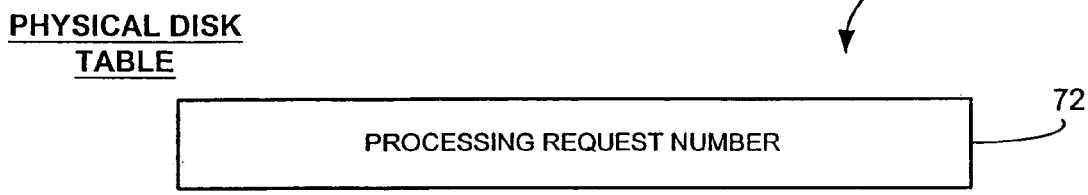
Fig_4

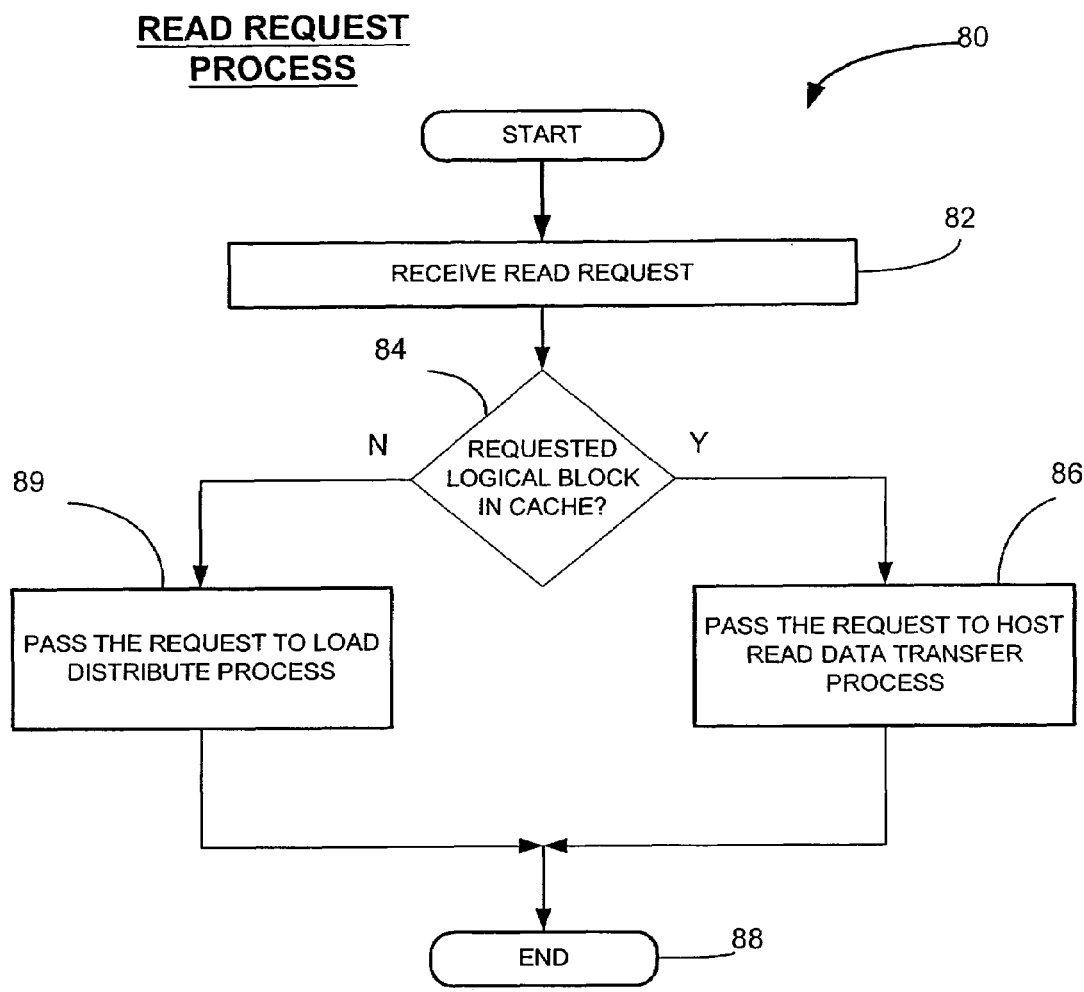
Fig_5
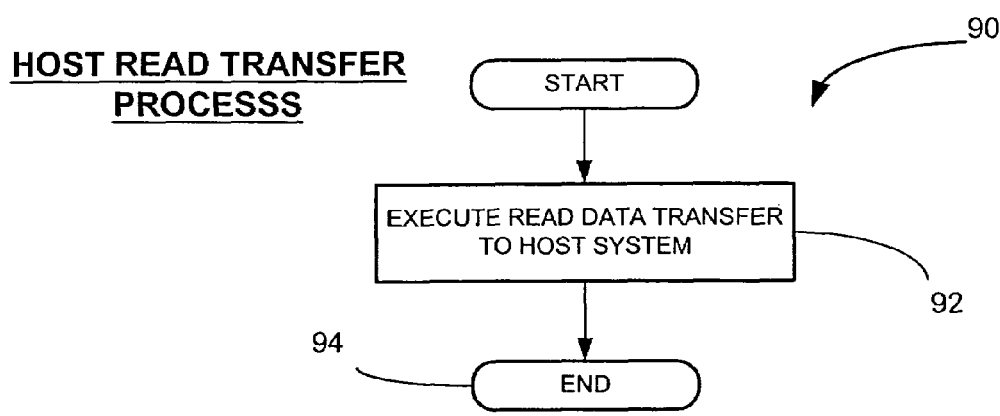
Fig_6

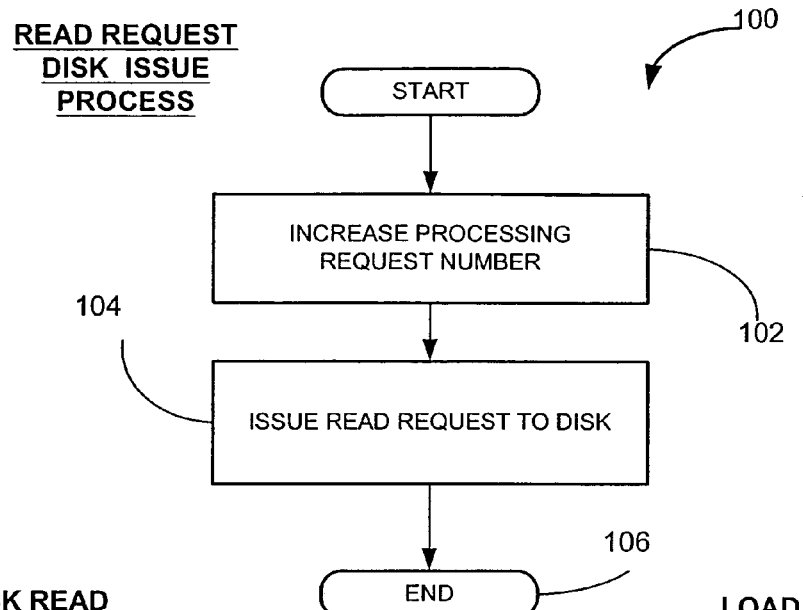
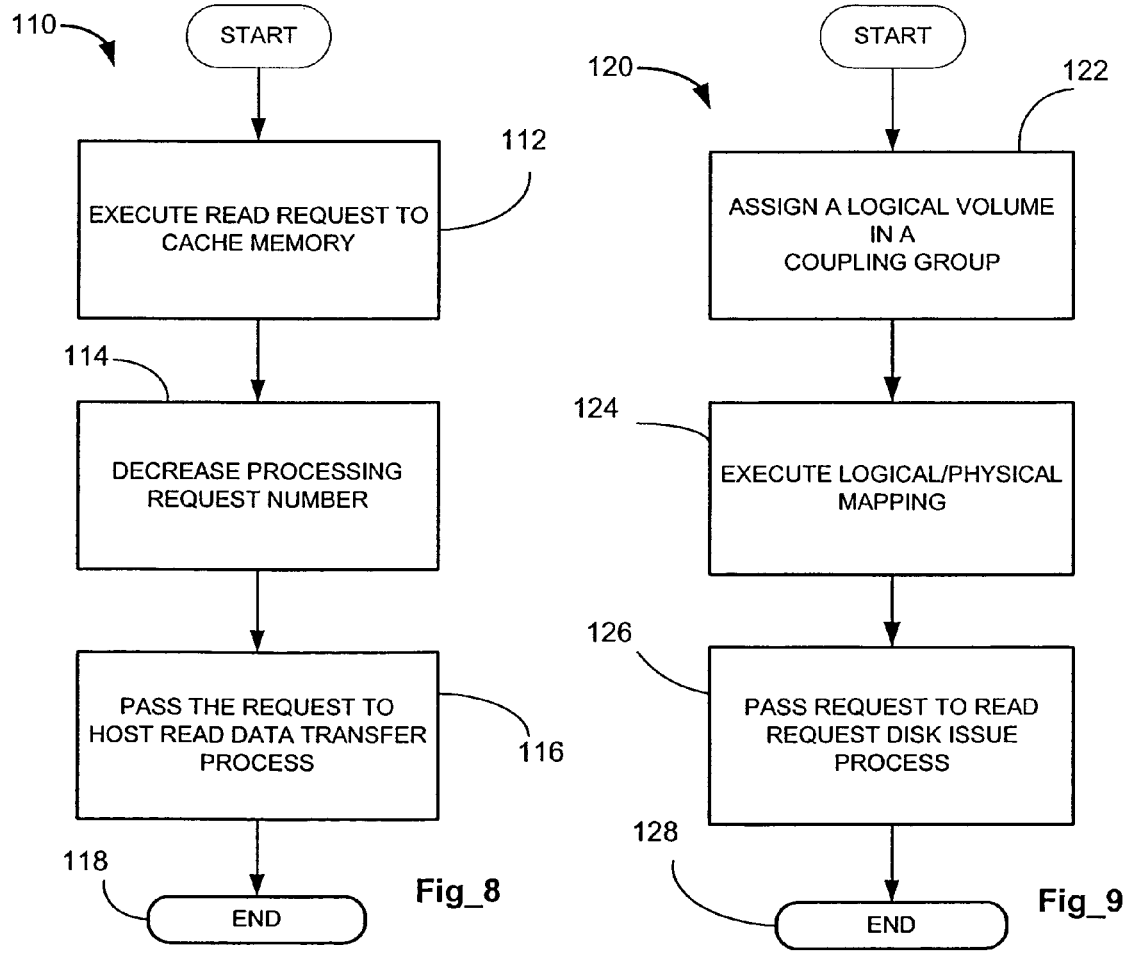

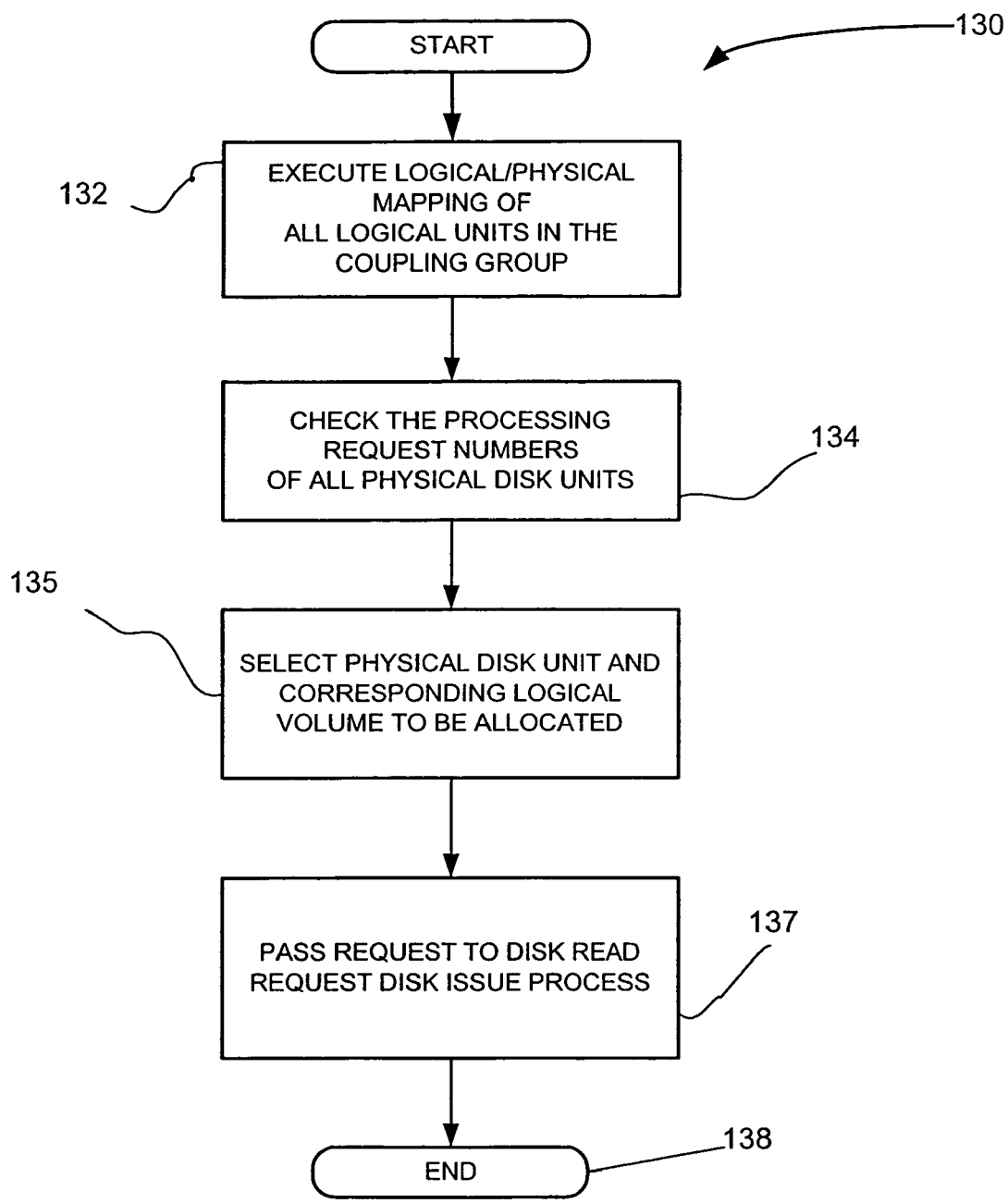
Fig_10

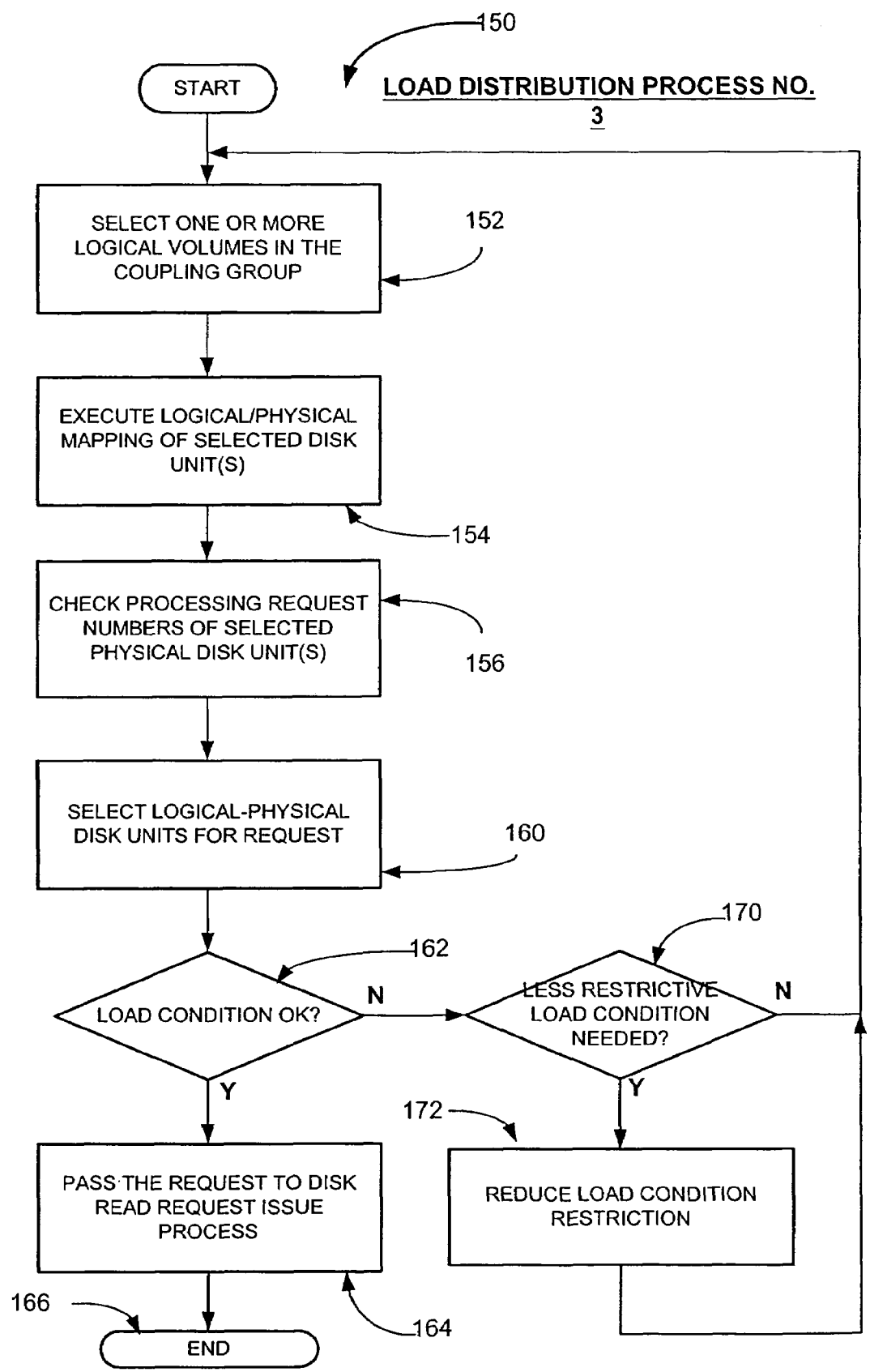
Fig_11

DISTRIBUTION OF I/O REQUESTS ACROSS MULTIPLE DISK UNITS

CROSS-REFERENCES TO RELATED APPLICATIONS

This application is a continuation of U.S. application Ser. No. 09/813,382, filed Mar. 20, 2001, now U.S. Pat. No. 6,728,832; which is a continuation-in-part application of U.S. application Ser. No. 09/619,000, filed Jul. 18, 2000 now U.S. Pat. No. 6,631,443; which is a continuation of application Ser. No. 09/116,344, filed Jul. 16, 1998, now U.S. Pat. No. 6,108,750; which is a continuation of application Ser. No. 08/868,075, filed Jun. 3, 1997, now U.S. Pat. No. 5,835,938; which is a continuation of application Ser. No. 08/355,274, filed Dec. 12, 1994, now U.S. Pat. No. 5,680,574; which is a continuation of application Ser. No. 07/648,998, filed Jan. 31, 1991, now abandoned. The disclosure of the aforementioned U.S. application Ser. No. 09/619,000 (hereinafter, "Referenced Application") is hereby incorporated by reference as if fully set forth herein.

BACKGROUND OF THE INVENTION

Present day hunger for data and data storage has given rise to computing complexes in which multiple data processing systems have access to a single data warehouse that is often implemented by a complex of disk storage units. The growth of Internet use has fed this hunger, and added the requirement that the data be continuously available. In order to achieve this latter requirement, many database complexes and data warehouses resort to such techniques as "mirroring" (i.e. using redundant storage to maintain a copy of everything written to the main storage element), error correction of various types and the like. Redundant arrays of independent (or inexpensive) disks (RAID) is one example. Certain RAID configurations ("levels") use data striping (spreading out blocks of each file across multiple disks) in order to protect the data, correcting errors when encounter, but redundancy is not used. This improves performance, but does not deliver fault tolerance. Other RAID levels (e.g., level 1) provide disk mirroring to add data redundancy and thereby fault tolerance.

While these techniques operate well to provide a measure of fault tolerance and, therefore, some continuous availability of the stored data, they can be overloaded when facilities employing these techniques must respond to a large volume of requests for data.

Thus, although continuous availability is now a feature of many database complexes and data warehouse configurations, they still can present a performance impediment by limiting the number of accesses that can be made at any particular moment in time.

SUMMARY OF THE INVENTION

The present invention is directed to a disk storage system with a storage control unit capable of receiving and simultaneously responding to multiple input/output (I/O) read requests from multiple users of the storage system.

Broadly, the invention is a disk storage system in which the storage control unit operates to control data transfers (i.e., reads and writes) between a number of host systems and a physical storage formed by a number of disk storage units. The storage control unit is preferably constructed to include multiple processor units (i.e., microprocessors), providing a platform that allows multiple processes to handle a number of simultaneous data transfers between the physical storage and the host systems. The control unit includes memory in which are maintained data structures that implement "logical" storage, comprising a number of logical storage units to which I/O requests, both reads and writes, are made by the host systems. Each logical storage unit has a designated corresponding physical storage area in the physical storage. Data is written to a predetermined one of the logical storage units (the "master" logical unit), and to its corresponding physical storage area. That data is also copied to the other logical storage units (the "slave" logical storage units), and through them to their corresponding physical storage areas. Thereby, multiple copies of the data is made available.

According to one embodiment of the invention, I/O read requests from the host systems are received and assigned to one of the logical storage units and, thereby, to the corresponding physical disk storage. Selection of a logical storage unit for assignment of an I/O read request is preferably made in a manner that distributes I/O read requests among the logical storage units and, thereby, the corresponding physical storage areas. For example, selection may be made on a round-robin basis, or any other basis that achieves a desired distribution among the logical storage units. In this manner, read requests are distributed over the areas of physical storage containing the multiple copies of the data requested.

In an alternate embodiment of the invention, I/O read requests are not immediately assigned to a logical unit. Rather, all the logical units are mapped to their matching physical discs maintaining the copies of the data of the I/O read request, and those physical disk storage areas examined for selection. For example, the physical disk with the smallest number of pending requests may be selected, and the I/O read request is assigned to the logical storage unit corresponding to that selected physical storage.

In a further embodiment of the invention, when an I/O read request is received, a number of the logical units, less than all, are mapped to their corresponding physical storage containing the requested data. The physical disks making up that physical storage are then reviewed to select, for example, the one with a small backlog of pending requests, and the I/O read request is assigned to the logical storage unit corresponding to the selected physical storage.

A number of advantages should now be evident to those skilled in this art. Rather than forming a bottleneck by having only a single data stream from a storage facility to multiple hosts, the storage system of the present invention provides multiple, parallel data paths between multiple processors and physical storage. This, in turn, provides almost instantaneous access to data. In addition, fault tolerance and continuous availability is provided.

These, and other advantages and aspects of the invention will become apparent to those skilled in the art upon reading of the following description of the specific embodiments, which should be taken in conjunction with the accompanying drawings.

BRIEF DESCRIPTION OF THE DRAWINGS

FIG. 1 is a simplified block diagram illustrating the storage control system of the present invention for distributing I/O read requests from a number of host processor systems over multiple copies of data maintained by physical storage;

FIG. 2 is a diagram of the logical disk group table, a one of the data structures used to implement a group of logical disk storage devices;

FIG. 3 is a logical disk table, identifying, for the corresponding logical storage device, the particulars of that device;

FIG. 4 shows the entry containing the processing request number for a physical disk of FIG. 1, indicating the backlog of I/O requests pending on the corresponding physical disk;

FIG. 5 is a flow chart illustrating a read request process;

FIG. 6 is a flow chart illustrating a host read transfer process;

FIG. 7 is a flow chart illustrating a read request disk issue process;

FIG. 8 is a flow chart illustrating a disk read transfer process;

FIG. 9 is a flow diagram showing the steps taken, according to one embodiment of the invention, to distribute read requests over the physical storage of FIG. 1;

FIG. 10 is a flow diagram showing the steps taken, according to another embodiment of the invention, to distribute read requests over the physical storage of FIG. 1; and FIG. 11 is a flow diagram showing the steps taken, according to yet another embodiment of the invention, to distribute read requests over the physical storage of FIG. 1.

DESCRIPTION OF THE SPECIFIC EMBODIMENTS

Turning now to the Figures, and for the moment specifically FIG. 1, there is illustrated a storage system, designated generally with the reference numeral 10 for handling I/O data communication between a number of host systems 12 ($12_1$, $12_2$, . . . , $12_k$) and a physical storage 14, comprising disk units 16 ($16_1$, $16_2$, . . . , $16_n$). The storage system 10 includes a controller unit 20, with associated memory/cache unit 22, operating to control data transfers between the host system 12 and the physical storage 14 (i.e., disk storage units 16). The controller 20 is preferably implemented by a number of individual processor elements (e.g., microprocessors) or similar devices in order to provide parallel processing, so that multiple different processes can be running simultaneously. For example, the controller 20 may utilize a symmetric multiprocessing (SMP) architecture to exploit the power of multiple processor units through distribution of the operating system to thereby balance the system load of the SMP configuration. In addition, an SMP configuration can reduce downtime because the operating system can continue to run on remaining processor units in the event one the processor units should fail. Alternatively, a single processing element may be used in time-share fashion to provide virtual parallel processing.

Maintained in the memory/cache unit 22 are data structures that implement representations of logical storage "coupling groups," each coupling group comprising one or more logical volumes. While there can be any practical number of logical coupling groups, only one, coupling group 30, is shown in FIG. 1 for the sake of simplicity. However, it should be understood that the discussion of the coupling group will apply to any other coupling group that may represented by data structures in the memory/cache unit 22.

As FIG. 1 illustrates, a logical coupling group 30 comprises logical volumes 32 ($32_1$, $32_2$, . . . $32_m$), the number of which will typically be less than or equal to the number of physical disk units 16, i.e., m≦n. Logical volume addresses map to addresses of the physical storage 14. As will be seen, a logical volume 32 can map, on a one-to-one basis, to one or more of the disk units 16 of the physical storage 14, or to a portion of a disk unit 16.

In this embodiment, one of the logical volumes $32_1$ is designated the "master" volume. All I/O data read or write requests made by a host system 12 are assumed to be directed to the master logical volume $32_1$ The remaining logical volumes 32 ($32_2$, . . . , $32_m$) are designated "slave" volumes.

I/O read or write requests that issue from the host systems 12 will include an address at which data is to be written (if an I/O write request) or from which data is to be read (if an I/O read requests). I/O write requests use the address contained in the request to map to a corresponding address of physical storage 14, and the data then is written to the master logical volume $32_1$. In addition, the data of the received I/O write request is also passed to each of the logical volumes $32_2$, . . . , $32_m$ of the logical coupling group 30, and similarly mapped and written to the areas of physical storage 14 corresponding to those logical slave volumes. Thus, multiple copies of data written to the storage system 10 are maintained and made available by the physical storage 14 for use by the present invention.

I/O read requests are processed, according to the present invention, in a manner that allows multiple requests to be handled in parallel. A received I/O read request is ultimately assigned to one of the logical volumes 32 for retrieval of the requested data from the physical storage corresponding to that logical slave volume. The present invention provides various methods for distributing the read requests among the logical volumes 32 for parallel handling.

There are three variations of load distribution according to the present invention. An initial load distribution method will first assign an incoming I/O read request to one logical volume 32. For example, a round-robin algorithm may be used for such assignment, although it will be evident to those skilled in this art that other selection methods may be employed. The address of the data contained in the I/O read request will be mapped from the selected logical volume 32 to an address within its corresponding physical storage. The data requested by the I/O read request will then be read from the physical disk 16 of the physical storage corresponding to the selected logical volume, and returned to the host system 12 that originated the request.

In a second variation, the method of the present invention will first perform the logical-physical mapping of all logical volumes 32 to obtain all the addresses of the data sought by the request in the physical storage 14. Then, a determination is made of which physical disk unit should be selected. For example, that selection may be based upon how many outstanding requests each physical disk has, and the I/O read request then assigned to the logical volume 32 corresponding to that selected disk unit 16.

Finally, according to the third variation of the present invention, an incoming I/O read request will again initiate a logical-physical mapping in order to obtain corresponding physical addresses of the data sought by the request in the physical storage 14. This time, however, less than the maximum number of logical volumes 32, for example only two of the logical slave volumes, are mapped to their corresponding physical storage. Again, as with the second variation, (for example, that selection may be based upon how many outstanding requests each physical disk has), a physical disk is selected, and the I/O read request assigned to the logical slave volume 32 corresponding to such selected physical disk 16.

FIGS. 2 and 3 illustrate the data structures used to establish the representative logical volumes 32. Turning first to FIG. 2, a logical coupling group table 40 is shown. As indicated above, there can be a number of logical groups (the coupling groups), although only one, logical group 30, is shown in FIG. 1. There would be, however, a separate logical coupling group table 40 for each the logical coupling group to be implemented. The logical coupling group table 40 shown in FIG. 2 corresponds to the coupling group 30 of FIG. 1. As FIG. 2 shows, a first entry 42 identifies the number of logical volumes 32 in the particular coupling group. The next entry 44 identifies the address of the master logical volume $32_1$. Entry 44 is followed by a number of entries 46 ($46_2, \ldots, 46_m$), each containing the address of a corresponding slave volume $32_2, \ldots, 32_m$. When an I/O read request is received, the address contained in the request will be the address of the target master volume $32_1$ If, however, there are more than one logical coupling groups, the coupling group tables 40 corresponding to each of those coupling groups will be searched with target address of a received I/O read request to find the master logical volume identified in the request.

Referring now to FIG. 3, there is shown a logical volume table 50 with information describing the makeup of a logical volume. There will a logical volume table 50 for each of the logical volumes 32. A first entry 52 of the logical volume table 50 identifies the mapping type used for storing data of the logical volume on its corresponding physical storage. For example, the mapping type may be a RAID 1 or a RAID 5 mapping, or any other mapping type. Entry 54 identifies the total capacity of the logical volume, as implemented by its corresponding physical storage 14, and entry 56 identifies the number of physical disk units that implement the logical volume 32 to which the table 50 corresponds.

Following the entry 56 are one or more entries 60. There will be one entry 60 for each of the number of physical disks that correspond to the logical volume of the table 50. Each of the entries 60 will have three fields 64, 66, and 68, respectively identifying the address of the disk unit 16 used by the logical volume, the start, and end, of the physical block to which the corresponding logical volume is mapped.

FIG. 4 shows a physical disk table 70. There will be a physical disk table 70 for each one of the physical disk units 16. The physical disk table 70 has only one entry 72, identifying the number of requests then pending and/or then being processed by the disk unit 16 to which the table 70 pertains.

Turning now to FIGS. 5–8, illustrated are the four processes, running on the multiple microprocessors that make up the controller 20, for handling the transfer of data in response to read requests issued by the host systems 12. There are a number of sets of the processes shown in FIGS. 5–8 to make available parallel data transfer operations between the processor systems 12 and the physical storage 14.

Turning first to FIG. 5, the flow diagram 40 for a read request process used in connection with the present invention is illustrated. The read request process operates to receive an I/O read request from a host system 12, determine whether the requested data may be in the memory/cache unit 22 or whether physical storage 14 must be accessed to retrieve the data, and pass the request to the appropriate process depending upon the determination made. As FIG. 5 shows, the read request process will receive, at step 82, the I/O read request. It will then, in step 84, make a determination of the location of the requested data, i.e., whether contained in the memory/cache unit 22 or not in which case it must be retrieved from physical storage 14). If so, step 84 is left in favor of step 86 in which the request will be passed to the host read transfer process 90 (FIG. 6), and terminate at step 88. If, however, step 24 determined that the requested data is not located in the memory/cache unit 22, step 84 will be left in favor of step 87 in which the I/O read request is passed to a load distribution process, described more fully below, for accessing physical storage 14 (i.e., one of the disk units 16) for the data.

Assuming that the requested data is in the memory/cache unit 22, step 86 of the read request process 80 will pass the request to the host read transfer process, illustrated by the flow diagram 90 is FIG. 6. There, at step 92, the host read transfer process will execute a transfer of the data to the requesting host by reading the data from the memory/cache unit 22, and transfer it to the requesting host system 12, terminating at step 94.

On the other hand, should the requested data be found in step 84 of the read request process to not be contained in the memory/cache unit 22, the controller 20 will invoke a load distribution process to select one of the logical units 32, and thereby a corresponding physical disk unit 16, to read the data. When a physical disk unit is finally selected, the read request disk issue process, illustrated by the flow diagram 100 shown in FIG. 7, is employed. The read request disk issue process begins with step 102 by incrementing the processing request number contained in the entry 72 of the physical disk table 70 (FIG. 4) to indicate that the selected disk unit 16 is processing an additional request. Step 102 of the read request disk issue process is then followed by step 104 in which the read request is issued to the selected physical disk 16. The read request disk issue process then terminates with step 106.

The selected disk unit 16 receiving the read request sent in step 104 of the read request disk issue process 100 will respond with the necessary preparations for reading the requested data and issue an interrupt to the controller 20 to indicate that the data is now ready for transfer, as is conventional. This will invoke the disk read transfer process, the flow diagram 110 of which is shown in FIG. 8. The disk read transfer process, upon receipt of the interrupt indicating data ready by a disk unit 16, will, at step 112, transfer the requested data from the selected disk unit 16 to the memory/cache unit 22. At step 114, the entry 70 containing the processing request 72 is decrement to indicate that the particular disk unit 16 has completed a pending request. Then, in step 116, the disk read transfer process 110 will transfer the data from the memory/cache unit 22 to the requesting host processor system 12, and terminate at step 118.

As indicated above, data is written by a host system 12 to storage system 10 by addressing the master logical unit $32_1$. That data is then mapped from the master logical volume $32_1$ to its corresponding physical storage 14, i.e., a disk unit or disk units 16. In addition, as also indicated above, that data is copied to each of the slave logical units $32_2, \ldots 32_m$ of the coupling group 30, and thereby to the corresponding disk units 16. Thus, multiple copies of data written to the storage system 10 provide fault tolerance and continuous data availability. In addition, the availability of multiple copies forms the basis of the load distribution methods of the present invention. I/O read requests that are received are distributed among the logical units 32 of the logical coupling group 30. A first embodiment of the load distribution process 120, according to one embodiment of the present invention, is broadly illustrated by the flow chart of FIG. 9.

The load distribution process 120 is called by step 87 of the read request process 80 (FIG. 5) when the data of an I/O read request is not found in the memory/cache unit 22. When called, the load distribution process 120 begins at step 122 by assigning the I/O read request to one of the logical units 32 ($32_1, \ldots, 32_m$). The assignment can be any method of selection or arbitration such as prearranged priorities as to which logical slave unit received a next I/O read request or other classic arbitration techniques or a "round-robin" technique. The round-robin technique involves assigning priorities according to a predetermined order among the logical units 32. However determined, the load distribution process 120 will then move to step 124 to execute a logical/physical mapping of the selected logical unit 32 to its corresponding physical disk unit 16, employing the information of the logical volume table 50 (FIG. 3).

The load distribution process of flow diagram 120, having located the data in physical storage 14, will then, in step 126, pass the I/O read request to the read request disk issue process 100 (FIG. 7) which will ultimately result in the requested data being returned to the requesting processor system 12 as described above.

The load distribution process 120 then ends at step 128.

FIG. 10 illustrates, in flow diagram form, an alternate load distribution process 130. As before, the load distribution process 130 will be called when it is determined, by step 84 of the read request process 80 (FIG. 5) that the data of an I/O read request is not located in the memory/cache unit 22. Accordingly, step 84 is left in favor of step 87 which will pass the I/O read request to the load distribution process 130 where, at step 132, a logical/physical mapping of all logical units 32 ($32_1, \ldots 32_m$) of the logical coupling group 30 is performed. This will obtain the addresses of the physical storage 14, corresponding to each of the logical units 32, where at the requested data resides.

With the physical storage addresses now available, the load distribution process 130, at step 134, will then, for each of the disk units 16, check the corresponding entry 70, examining the processing request 72 for each. Then, in step 135, the load distribution process 130 will select that physical disk unit having the lowest processing request 72 and allocate the I/O read request.

With the physical disk unit 16 so identified, that identification, together with the I/O read request is then passed to the read request disk issue process 100 (FIG. 7) to initiate the transfer of the data from the physical storage 14 to the requesting processor system 12, as described above.

Finally, the load distribution process 130 will terminate at step 138.

A still another embodiment of the load distribution process of the present invention is illustrated in FIG. 11 as load distribution process 150. As shown, the load distribution process 150 begins with step 152 when the I/O read request is passed thereto by step 87 of the read request process 80 (FIG. 5). In step 152, the load distribution process 150 will select one or more of the logical units 32 of coupling group 30. The selected logical units 32 are, in step 154, mapped to their corresponding physical units 16 of physical storage 14.

Then, in step 156, the load distribution process 150 will access the entries 70 corresponding to each of the selected physical disks 16, to obtain each of their processing request 72. In step 160, comparing the processing request 72 for each of the physical disk units 16 to one another, one (e.g., the one with the lowest number) will be selected.

Step 162 checks the processing request 72 of the selected physical disk 16 to determine if the "load" of the selected physical disk is appropriate; that is, if the processing request 72 is within a predetermined parameter. If so, step 162 will exit in favor of step 164 in which the load distribution process 150 will pass the I/O read request to the read request disk issue process 100 (FIG. 7) in order to access the data and initiate the steps necessary to pass that data to the requesting processor system 12. The load distribution process 150 will then terminate at step 166.

If, however, step 162 determines that the load condition of the selected physical disk unit 16 is not within an acceptable parameter, step 162 will be exited in favor of determining, in step 170, whether or not a less restrictive load condition is needed. If so, in step 172, the load condition restriction is made more liberal, and the load distribution process 150 returns to step 152 to again locate the data on a physical disk whose load is now within the modified load condition parameter.

Similarly, if it is determined in step 170 that a less restrictive load condition is not needed, step 170 is left to return the load distribution process 150 to step 152 to again select a physical disk.

What is claimed is:

1. In a storage system to be coupled to a host computing system including at least one processor unit, a method of conducting input/output (I/O) requests from the host computing system, the method including the steps of:
   providing a plurality of logical volumes including a first logical volume and a second logical volume;
   mapping each of the first and the second logical volumes to a corresponding one or more of the physical disk units, each of the first and the second logical volumes carrying the same data;
   receiving from the host computing system a first read request;
   assigning the first read request to the first logical volume;
   receiving from the host computing system a second read request; and
   assigning the second read request to the second logical volume.

2. The method of claim 1, further comprising the step of:
   identifying a logical volume of the logical volumes as a master logical volume;
   writing data to the master logical volume; and
   copying the data to the first logical volume and the second logical volume.

3. A storage system to be coupled to a host computing system including at least one processor unit, comprising:
   a controller configured to receive from the host computing system read requests;
   a memory associated with the controller; and
   a plurality of physical disk units coupled to the controller;
   wherein the memory stores data structure information to provide a plurality of logical volumes including a first logical volume and a second logical volume and to map each of the first and the second logical volumes to a corresponding one or more of the physical disk units, each of the first and the second logical volumes carrying the same data,
   wherein a first read request from the host computing system is assigned to the first logical volume, and a second read request from the host computing system is assigned to the second logical volume.

4. The storage system of claim 3, wherein a logical volume of the logical volumes is identified as a master logical volume;
   wherein data is written to the master logical volume and the data is copied to the first logical volume and the second logical volume.

5. A storage system to be coupled to a host computing system including at least one processor unit, comprising:
- means for providing a plurality of logical volumes including a first logical volume and a second logical volume;
- means for mapping each of the first and the second logical volumes to a corresponding one or more of the physical disk units, each of the first and the second logical volumes carrying the same data;
- means for receiving from the host computing system a first read request;
- means for assigning the first read request to the first logical volume;
- means for receiving from the host computing system a second read request; and
- means for assigning the second read request to the second logical volume.

6. The storage system of claim 5,
- means for identifying a logical volume of the logical volumes as a master logical volume;
- means for writing data to the master logical volume; and
- means for copying the data to the first logical volume and the second logical volume.

* * * * *